(12) United States Patent
Olaleye et al.

(10) Patent No.: US 9,463,681 B2
(45) Date of Patent: Oct. 11, 2016

(54) REAL-TIME ENGINE LOAD CONTROL FOR ELECTRONICALLY CONTROLLED ENGINES

(71) Applicant: THERMO KING CORPORATION, Minneapolis, MN (US)

(72) Inventors: Omosola Waidi Olaleye, Brooklyn Park, MN (US); Alan Gustafson, Eden Prairie, MN (US)

(73) Assignee: THERMO KING CORPORATION, Minneapolis, MN (US)

( * ) Notice: Subject to any disclaimer, the term of this patent is extended or adjusted under 35 U.S.C. 154(b) by 671 days.

(21) Appl. No.: 13/873,385

(22) Filed: Apr. 30, 2013

(65) Prior Publication Data

US 2013/0289847 A1     Oct. 31, 2013

Related U.S. Application Data

(60) Provisional application No. 61/640,598, filed on Apr. 30, 2012.

(51) Int. Cl.
 *B60H 1/00* (2006.01)
 *F02D 41/02* (2006.01)
 (Continued)

(52) U.S. Cl.
 CPC ...... *B60H 1/00735* (2013.01); *B60H 1/00764* (2013.01); *B60H 1/00885* (2013.01);
 (Continued)

(58) Field of Classification Search
 CPC .............. B60H 1/3222; B60H 1/3232; B60H 1/00371; B60H 1/00735; B60H 1/00764; B60H 1/00885; B60P 3/20; B60Y 2200/147; F25B 2400/13; F25B 27/00; F25B 49/022; F25B 29/003; Y02T 10/166; Y02T 10/16; F02D 41/0205; F02D 29/00; F02D 41/02; F02D 41/266; F02D 41/28; F02D 2250/18
 See application file for complete search history.

(56) References Cited

U.S. PATENT DOCUMENTS 4,391,242 A   7/1983 Mashio
4,556,942 A  12/1985 Russo et al.
(Continued)

FOREIGN PATENT DOCUMENTS

EP  1790921     5/2007
JP  2010156486  7/2010
(Continued)

OTHER PUBLICATIONS

International Search Report for PCT/US2013/038743 mailed Aug. 14, 2013, 3 pages.
(Continued)

*Primary Examiner* — Sizo Vilakazi
(74) *Attorney, Agent, or Firm* — Hamre, Schumann, Mueller & Larson, P.C.

(57) ABSTRACT

Methods and systems for real-time engine load control (RTLC) for electronically controlled engines in a transport refrigeration system (TRS) are provided. In particular, a RTLC system is provided to control an electronically controlled engine for the TRS in order to maximize temperature control of the TRS, while preventing engine shut down due to a TRS load demand that exceeds the engine's horsepower output capability. The RTLC system includes an engine control unit (ECU) connected to a TRS controller. TRS controller includes an ECU data processing component, a load control component, an ETV control component, a TRS load demand component and a temperature control and TRS protection component.

20 Claims, 4 Drawing Sheets

(51) Int. Cl.
*F02D 41/26* (2006.01)
*F02D 41/28* (2006.01)
*F02D 29/00* (2006.01)

(52) U.S. Cl.
CPC ............. *F02D41/02* (2013.01); *F02D 41/266* (2013.01); *F02D 41/28* (2013.01); *F02D 29/00* (2013.01); *F02D 2250/18* (2013.01)

(56) References Cited

U.S. PATENT DOCUMENTS

| | | |
|---|---|---|
| 4,688,530 A | 8/1987 | Nishikawa et al. |
| 4,735,055 A | 4/1988 | Taylor et al. |
| 5,168,713 A | 12/1992 | Howland |
| 5,410,889 A * | 5/1995 | Sjoholm .................... F25B 5/00 62/160 |
| 5,438,844 A | 8/1995 | Hoglund et al. |
| 5,557,938 A * | 9/1996 | Hanson ................. B60H 1/3208 62/126 |
| 5,572,879 A * | 11/1996 | Harrington .......... B60H 1/3208 62/209 |
| 5,596,878 A * | 1/1997 | Hanson .............. B60H 1/00007 62/160 |
| 5,628,199 A | 5/1997 | Hoglund et al. |
| 6,196,012 B1 | 3/2001 | Reason et al. |
| 6,226,998 B1 | 5/2001 | Reason et al. |
| 6,249,726 B1 | 6/2001 | Burke, II et al. |
| 6,318,100 B1 | 11/2001 | Brendel et al. |
| 6,369,536 B2 | 4/2002 | Beifus et al. |
| 6,910,341 B2 | 6/2005 | Srichai et al. |
| 2008/0087029 A1 | 4/2008 | Renken et al. |
| 2009/0228149 A1 | 9/2009 | Alston |
| 2011/0247350 A1 * | 10/2011 | Awwad ................... F25B 27/00 62/115 |
| 2012/0000212 A1 | 1/2012 | Sanders et al. |
| 2015/0013357 A1 * | 1/2015 | Stockbridge ........ F02D 41/2432 62/115 |

FOREIGN PATENT DOCUMENTS

| | | | |
|---|---|---|---|
| WO | 2012047499 | 4/2012 | |
| WO | WO 2012047499 A2 * | 4/2012 | ......... B60H 1/00364 |

OTHER PUBLICATIONS

Written Opinion for PCT/US2013/038743 mailed Aug. 14, 2013, 7 pages.

* cited by examiner

REAL-TIME ENGINE LOAD CONTROL FOR ELECTRONICALLY CONTROLLED ENGINES

FIELD OF TECHNOLOGY

The embodiments disclosed here generally relate to transport refrigeration systems. More specifically, the embodiments described herein relate to real-time engine load control for electronically controlled engines in a transport refrigeration system.

BACKGROUND

Existing transport refrigeration systems are used to cool containers, trailers, and other similar transport units. Modern containers may be efficiently stacked for shipment by ship or rail. When containers are shipped by a truck, a single container is placed on a container chassis. When cargo in the container includes perishable products (e.g., food product, flowers, etc.), the temperature of the container may be controlled to limit spoilage of the cargo during shipment.

Some existing transport containers include a generator set that supplies power to temperature-controlling components of the transport refrigeration system. These generator sets are typically attached directly to the container or container chassis, and include an engine to power a generator, as well as a fuel container to supply fuel to the generator sets.

SUMMARY

The embodiments described herein relate to real-time engine load control for electronically controlled engines in a Transport Refrigeration System (TRS).

In some embodiments, the TRS is configured to control an engine of a generator set for the TRS in order to maximize temperature control of the TRS, while preventing engine shut down due to a TRS load demand that exceeds the engine's horsepower output capability are provided.

In particular, the embodiments provided herein use real-time engine performance data provided by the engine to regulate TRS load demand from the engine are provided. The accurate real-time engine load information is computed by an Engine Control Unit (ECU) of the engine and is used by a TRS Controller of the TRS to control TRS load demand from the TRS. The ECU can provide real-time engine load information such as, for example, one or more of engine percent load at current speed data, actual engine percent torque data, engine demand—percent torque data, engine fuel rate data, etc. to the TRS Controller. The TRS Controller then combines the real-time engine load information with real-time TRS information such as, for example, one or more of compressor discharge pressure data, compressor suction pressure data, solenoid and valve state data, Electronic Throttle Valve (ETV) position data, TRS operating mode data, TRS configuration data, etc. to compute load control parameters. The TRU Controller can then output control commands to, for example, an ETV and other loads of the TRS as needed to increase or decrease the magnitude of load the engine sees along with a specified change rate for increasing or decreasing the magnitude of the load. As a result, temperature control of the TRS can be maximized while preventing an abrupt engine shut down due to overloading the engine.

In one embodiment, a RTLC system is provided to control an electronically controlled engine for the TRS in order to maximize temperature control of the TRS, while preventing engine shut down due to a TRS load demand that exceeds the engine's horsepower output capability. The RTLC system includes an engine control unit (ECU) connected to a TRS controller. TRS controller includes an ECU data processing component, a load control component, an ETV control component, a TRS load demand component and a temperature control and TRS protection component.

Other aspects of the invention will become apparent by consideration of the detailed description and accompanying drawings.

DETAILED DESCRIPTION

Figure 1:
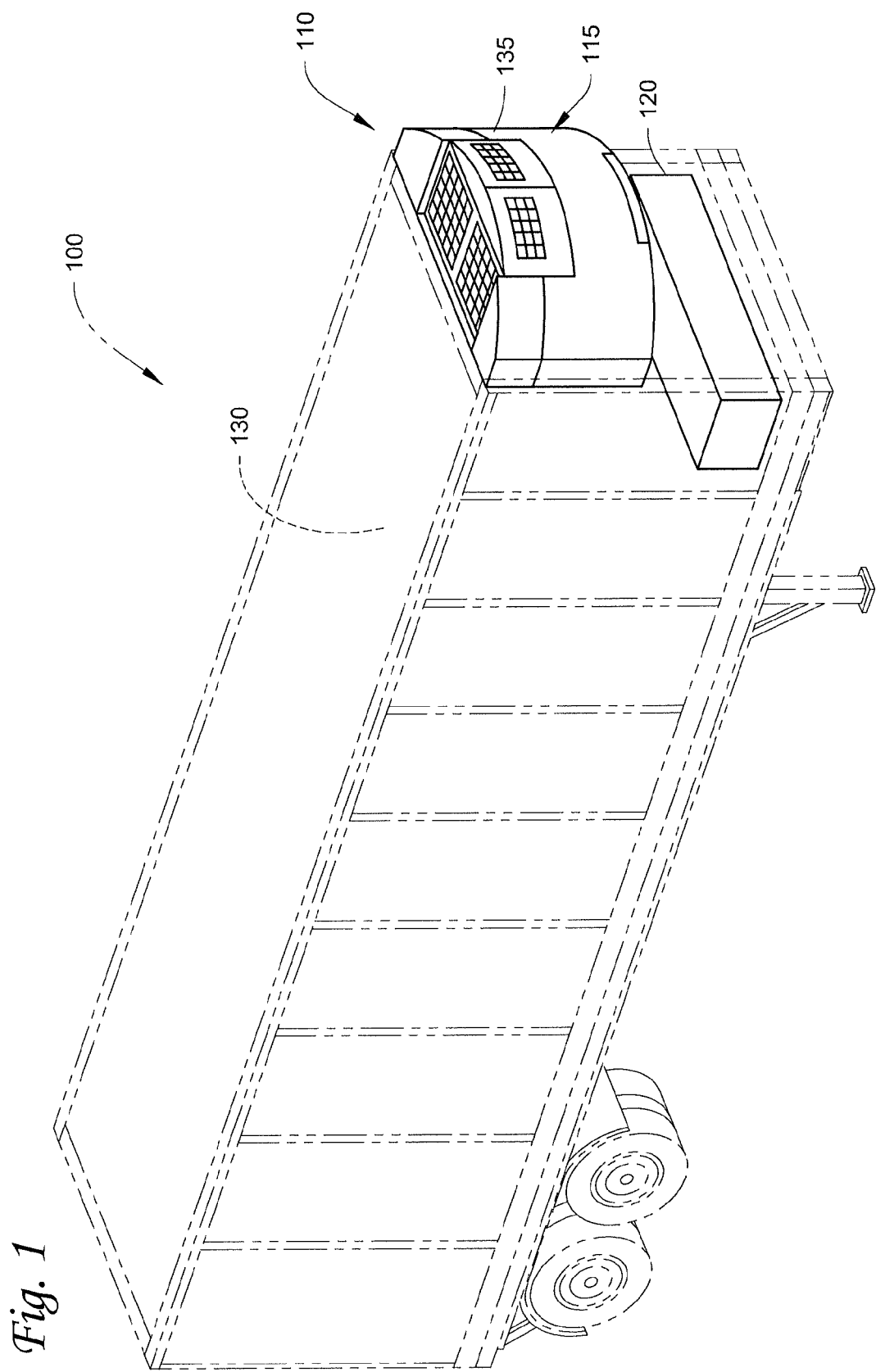
FIG. 1 illustrates an elevated perspective view of a transport container unit with a transport refrigeration system, according to one embodiment.

The embodiments described herein relate to real-time engine load control for electronically controlled engines in a TRS.

In some embodiments, a Real-Time Engine Load Control (RTELC) system of the TRS can control an electronically controlled engine for the TRS in order to maximize temperature control of the TRS, while preventing engine shut down due to a TRS load demand that exceeds the engine's horsepower output capability. In particular the embodiments described herein use real-time engine load control data to regulate system TRS load demand from the engine. The embodiments described herein ensure that the TRS load demand is controlled such that the maximum horsepower output capable by the engine is never exceed during a wide range of operating conditions.

Some transport units include a generator set that includes an engine used to supply power to a TRS of the transport unit to maintain a temperature inside the transport unit. The maximum horsepower output of the engine can vary from engine to engine due to the inherent variability associated with manufacturing an engine. In the embodiments described herein, the TRS Controller obtains engine load information directly from the ECU of the engine. This allows the TRS Controller to control the engine according to the engine's unique injection characteristics rather than controlling an engine based on a conservative engine control method that bases control limits on the lowest common denominator engine type.

In the following description of the illustrated figures, embodiments for real-time engine load control for electronically controlled engines in a TRS are provided. These embodiments can provide increased fuel efficiency, maintain accurate temperature control of a space within the transport unit, provide improved engine protection, increase the time that the TRS can safely operate, and provide improved reliability and durability of the engine.

References are made to the accompanying drawings that form a part hereof, and in which is shown by way of illustration of the embodiments in which the embodiments may be practiced. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings. It is to be understood that the phraseology and terminology used herein is for the purpose of description and should not be regarded as limiting.

It will be appreciated that the embodiments described herein are not limited to trucks, trailers and container units. The embodiments described herein may be used in any other suitable temperature controlled apparatuses such as a ship board container, an air cargo cabin, an over the road truck cabin, etc. The TRS may be a vapor-compressor type refrigeration system, or any other suitable refrigeration systems that can use refrigerant, cold plate technology, etc.

FIG. 1 illustrates an elevated perspective view of a transport unit 100 that has a TRS 110. The TRS 110 includes a TRU 115 connected to a generator set 120. The TRU 115 draws power from the generator set 120. The TRU 115 is configured to transfer heat between an internal space 130 of the transport unit 100 and the outside environment. In some embodiments, the TRS 110 is a multi-zone system in which different zones or areas of the internal space 130 are controlled to meet different refrigeration requirements based on the cargo stored in the particular zone.

As shown in FIG. 1, the TRU 115 is positioned adjacent to a front side of the transport unit 100 and is enclosed in a housing 135. The TRU 115 is in communication with the space 130 and controls the temperature in the space 130. The TRU 115 includes a TRS Controller (not shown) that regulates various operating conditions (e.g., temperature, humidity, etc.) of the space 130 and is powered by the generator set 120. The TRU 115 also includes a closed refrigerant circuit (not shown). The closed refrigerant circuit regulates various operating conditions (e.g., temperature, humidity, etc.) of the space 130, and includes an Electronic Throttle Valve (ETV), a compressor coupled to a condenser and an evaporator that cools the space 130 and the perishable cargo. Generally, the compressor requires the most energy among different components of the TRS 110 and is the primary contributor of the load seen by an engine (not shown) of the generator set 120.

The generator set 120 generally includes an engine, an electronic controller unit (ECU) (not shown), a fuel container (not shown) and a generator (not shown). The engine may be an internal combustion engine (e.g., diesel engine, etc.) that may generally have a cooling system (e.g., water or liquid coolant system), an oil lubrication system, and an electrical system (none shown). An air filtration system (not shown) filters air directed into a combustion chamber (not shown) of the engine. The engine may also be an engine that is configured specifically for the TRS 110. The fuel container is in fluid communication with the engine to deliver a supply of fuel to the engine.

The engine is further controlled by the ECU. The ECU can be configured to regulate an amount of fuel delivered to the engine and can be configured to operate the engine at multiple speeds. The ECU is generally configured to allow the engine to be maintained at a chosen speed regardless of the load seen by the engine. As discussed in more detail below, the ECU is connected to and communicates with the TRS Controller.

Figure 2:
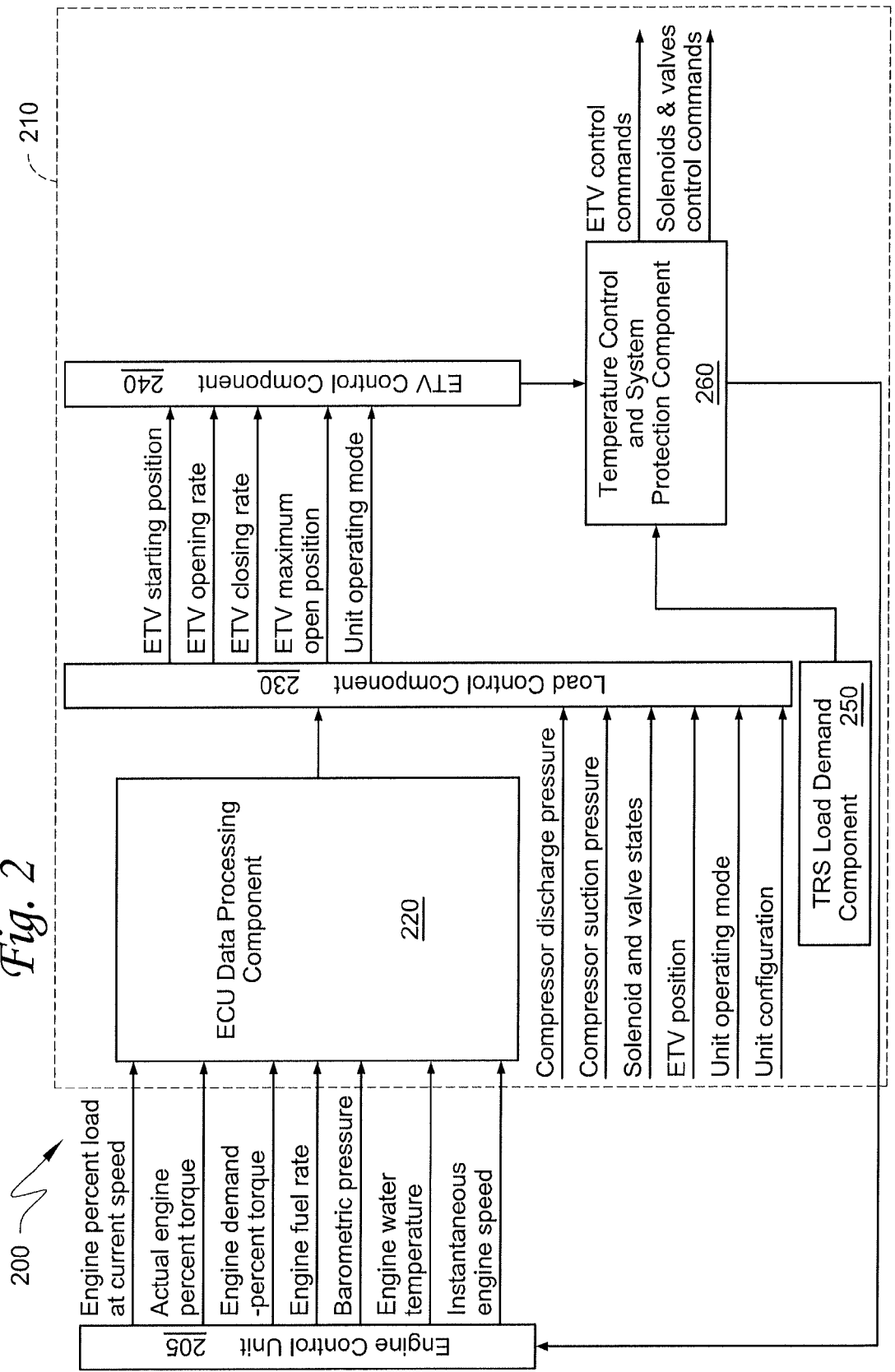
FIG. 2 illustrates a block diagram of a Real-Time Engine Load Control System, according to one embodiment.

FIG. 2 illustrates a block diagram of a Real-Time Engine Load Control (RTELC) system 200. The RTELC system 200 includes an ECU 205 of an engine of a generator set that is connected to a TRS Controller 210 of a TRS via a wireless or wired connection. In one embodiment, the ECU 205 is connected to the TRS Controller 210 via a hardwired Control Area Network (CAN) communication bus. The TRS Controller 210 includes an ECU data processing component 220, a load control component 230, an ETV control component 240, a TRS load demand component 250 and a temperature control and TRS protection component 260.

The ECU 205 is configured to send real-time engine load information such as, for example, one or more of engine percent load at current speed data, actual engine percent torque data, engine demand—percent torque data, engine fuel rate data, etc. to the TRS Controller 210. In one embodiment, the real-time engine load information is sent to the TRS Controller 210 in a hexadecimal data format. The real-time engine load information is processed by the ECU data processing component 220. The processing performed on the real-time load information by the ECU data processing component 220 can include scaling, aggregating and time filtering the real-time load information before sending the processed real-time engine load information to the load control component 230. In some embodiments, the RTELC system 200 relies primarily on the engine percent load at current speed data, and uses other real-time engine load information such as, for example, the actual engine percent torque data, the engine demand—percent torque data, the engine fuel rate data, etc. as required. For example, in one embodiment, the actual engine percent torque data and the fuel rate data are used under a fault condition in which the engine percent load at current speed data is missing or corrupted.

The load control component 230 is configured to receive processed real-time load information from the ECU data processing component 220 as well as real-time TRS information sent from different portions of the TRS. The real-time TRS information can include, for example, compressor discharge pressure data, compressor suction pressure data, solenoid and valve state data, ETV position data, TRS operating mode data, TRS configuration data, etc. The load control component 230 combines the processed real-time load information with the real-time TRS information to compute load control parameters such as, for example, one or more of ETV starting position data, ETV operating rate data, ETV closing rate data, ETV maximum open position data, TRS operating mode data, etc. The load control parameters are then sent to the ETV control component 240.

In some embodiments, the load control component 230 can compute load control parameters based on the processed real-time load information with or without using the real-time TRS information. Also, in some embodiments, when the ECU 205 fails to communicate with the TRS Controller 210, the load control component 230 can compute the load control parameters based on the real-time TRS information.

The ETV control component 240 uses the load control parameters to generate preliminary ETV control commands for controlling the ETV. By controlling the ETV, the system 200 can control the operation of a compressor of the TRS, which typically is the largest contributor to the load seen by the engine. The preliminary ETV control commands generated by the ETV control component 240 are provided to the temperature control and TRS protection component 250.

The system 200 also includes a TRS load demand component 250. The TRS load demand component 250 provides temperature information regarding the difference between the ambient temperature surrounding the transport unit and the temperature of the space within the transport unit to the temperature control and TRS protection component 260. That is, the TRS load demand component 250 provides the temperature control and TRS protection component 250 a desired position for the ETV.

The temperature control and TRS protection component 260 uses the preliminary ETV control commands from the ETV control component 240 and TRS load demand information obtained from the TRS load demand component 250 to generate ETV control commands and solenoid and valve control commands. The TRS load demand information allows the temperature control and TRS protection component 260 to set the TRS load demand required by the compressor in order to set the space within the transport unit to the desired temperature setpoint. In some embodiments, the temperature control and TRS protection component 260 is a real-time arbiter of temperature control and system protection demands. For example, when a difference between the desired temperature of the space within the transport unit and the actual temperature of the space within the transport unit is above a maximum threshold, the TRS load demand component 250 demands maximum power from the engine while the temperature control and TRS protection component 260 is configured to limit the output of the engine to a safe limit. The temperature control and TRS protection component 260 is also configured to send a desired engine operating speed back to the ECU 205.

The preliminary ETV control commands allows the temperature control and TRS protection component 260 to determine the current horsepower output of the engine in relation to the maximum allowed horse power output of that particular engine. Based on the preliminary ETV control commands and the temperature information, the temperature control and TRS protection component 260 can generate ETV control commands and solenoid and valve control commands that will restrict the TRS load demand such that the system load does not exceed a maximum defined control limit of the particular engine being used. In particular, the ETV control commands effectively control the compressor load and the solenoid and valve control commands are used to switch operating modes of the TRS. In some embodiments, switching operating modes of the TRS can impact compressor load for short periods of time.

Figure 4:
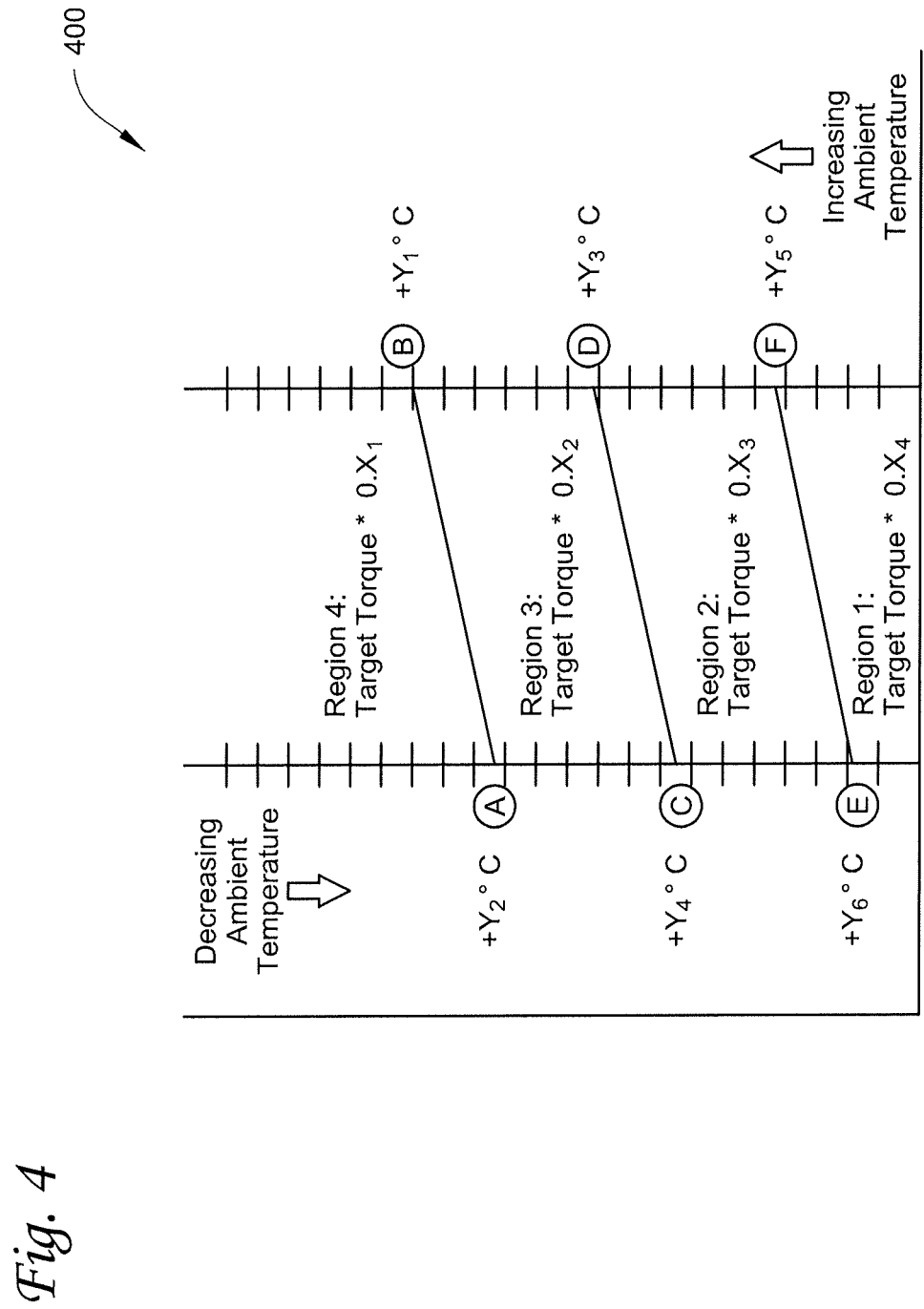
FIG. 4 illustrates a chart for setting a target torque value based on an ambient temperature, according to one embodiment.

In some embodiments, the temperature control and TRS protection component 260 includes a series of arbitration factors to set the TRS load demand so as to not exceed the maximum defined control limit. For example, in one embodiment, the TRS load demand component 250 is configured to demand a load in accordance with the load necessary to set the space within the transport unit to the desired temperature setpoint and the temperature control and TRS protection component 260 is configured to limit a target torque value of the engine based on factors such as an ambient temperature outside the transport unit. For example, FIG. 4 illustrates a chart 400 for setting a target torque value based on an ambient temperature, according to one embodiment.

The maximum defined control point limit of the engine can vary due to various operating conditions including, for example, the current engine operating speed, the altitude of the transport unit, the ambient temperature surrounding the transport unit, the target engine coolant temperature required by the engine, the target suction pressure required by the compressor, etc.

Thus, the ETV control commands and the solenoid and valve control commands generated by the temperature control and TRS protection component 260 can increase or decrease the magnitude of load the engine sees along with a specified change rate for increasing or decreasing the magnitude of the load. As a result, temperature control of the TRS can be maximized while preventing an abrupt engine shut down due to overloading the engine.

Figure 3:
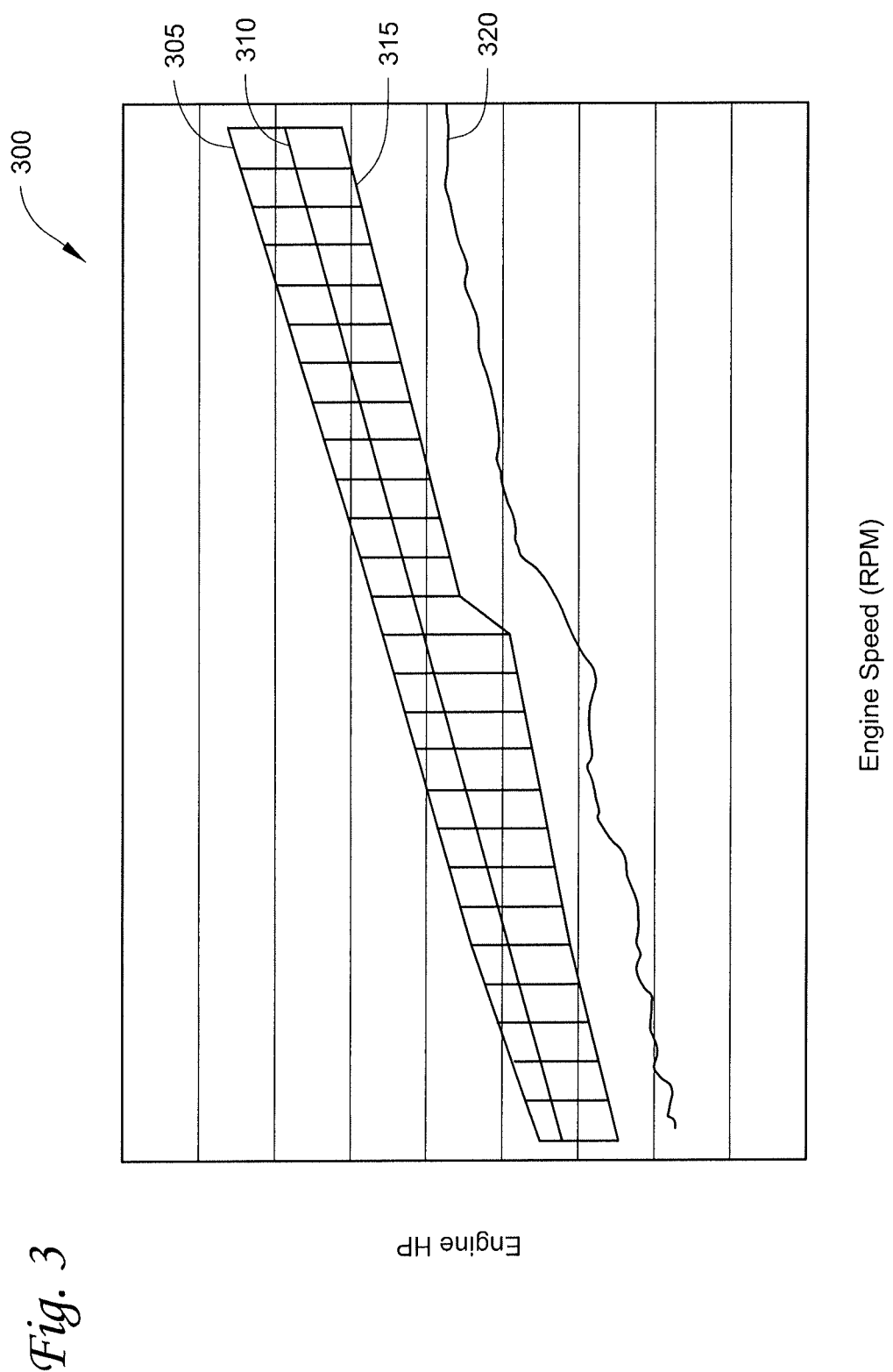
FIG. 3 illustrates a chart that provides engine horsepower versus TRS load demand curves, according to one embodiment.

FIG. 3 illustrates a chart 300 that provides engine horsepower versus TRS load demand curves. In particular, the chart 300 includes a maximum engine control limit curve 305, a TRS maximum engine TRS load demand control curve at sea level 310, a TRS maximum engine TRS load demand control curve at the high altitude 315, and a conventional mechanically controlled engine TRS load demand control curve 320. In FIG. 3, the high altitude is defined as 5000 ft above sea level.

As shown in FIG. 3, because the system 200 receives real-time engine load control information from the engine, the RTLC system (such as the RTLC system 200 in FIG. 2) can set the TRS maximum engine control limit curve at sea level 310 close to the maximum engine control limit curve 305. In some embodiments, the RTLC system can safely optimize the TRS maximum engine control curve 310 up to 90% of the maximum engine control curve 305 at sea level, and ensure that the RTLC system requests a TRS load demand that exceeds the maximum engine control limit curve 305, which could result in the engine stalling due to overload conditions. Moreover, the RTLC system can set the TRS maximum engine control curve at the high altitude 315 closer to the maximum engine control curve 305 than the conventional mechanically controlled engine TRS load demand control curve 320. This is because in conventional mechanically controlled engines do not include an ECU and thus cannot obtain real-time engine load control information.

Accordingly, the engine TRS load demand control curve cannot be set based on the particular engine or the particular operating conditions seen by the transport unit during transport. Rather, in order to safely operate the conventional mechanical engine, the same conventional mechanically controlled engine TRS load demand control curve 320 is set for all engines of a particular type and is set to ensure proper engine operation during any operating conditions that the transport unit may face during transport.

Thus, the use of real-time engine load control for electronically controlled engines in a TRS as described herein can provide improved fuel efficiency when compared to mechanically controlled engines. Also, the amount of time that the TRS can operate safely and the engine life can be increased by preventing an engine stall due to overload conditions.

Aspects:

It is noted that any of aspects 1-8 below can be combined with any of aspects 9-16 and aspects 17-19. Also, any of aspects of 9-16 can be combined with any of aspects 17-19.

1. A real-time engine load control system for a transport refrigeration system of a refrigerated transport unit comprising:
    an engine control unit of an electronically controlled engine configured to provide power to the transport refrigeration system, wherein the engine control unit is programmed to control the electronically controlled engine; and
    a transport refrigeration system controller connected to the engine control unit, the transport refrigeration system controller being programmed to obtain real-time transport refrigeration system information and being programmed to regulate operating conditions within the refrigerated transport unit, wherein the engine control unit is programmed to send real-time engine load information to the transport refrigeration system controller, the transport refrigeration system controller is programmed to compute a load control parameter for controlling a system load of the transport refrigeration system based on at least one of the real-time transport refrigeration system information and the real-time engine load information.

2. The real-time engine load control system of aspect 1, wherein the transport refrigeration system controller is connected to the electronic control unit via a hardwired control area network communication bus.

3. The real-time engine load control system of aspects 1-2, wherein the transport refrigeration system controller includes:

an electronic control unit data processing component that is programmed to process the real-time engine load information;

a load control component that is programmed to compute the load control parameter for controlling the system load of the transport refrigeration system based on at least one of the real-time transport refrigeration system information and the real-time engine load information;

an electronic throttle valve control component that is programmed to use the load parameter to generate a preliminary electronic throttle valve control command for controlling an electronic throttle valve of the transport refrigeration system;

a transport refrigeration system load demand component that is programmed to determine a transport refrigeration system load demand; and a temperature control and transport refrigeration system protection component that is programmed to generate an electronic throttle valve control command based on the preliminary electronic throttle valve control command and the transport refrigeration system load demand.

4. The real-time engine load control system of aspect 3, wherein the temperature control and transport refrigeration system protection component is programmed to send a desired engine operating speed to the electronic control unit.

5. The real-time engine load control system of aspects 3-4, wherein the temperature control and transport refrigeration system protection component is programmed to generate the electronic throttle valve control command such that the system load of the transport refrigeration system does not exceed a maximum defined control limit of the electronically controlled engine.

6. The real-time engine load control system of aspects 1-5, wherein the real-time engine load information includes at least one of: an engine percent load at current speed data; an actual engine percent torque data; an engine demand—percent torque data; and an engine fuel rate data.

7. The real-time engine load control system of aspects 1-6, wherein the real-time transport refrigeration system information includes at least one of: a compressor discharge pressure data; a compressor suction pressure data; a solenoid and valve state data; an electronic throttle valve position data; a transport refrigeration system operating mode data; and a transport refrigeration system configuration data.

8. The real-time engine load control system of aspects 1-7, wherein the load control parameter includes at least one of: an electronic throttle valve closing rate data; an electronic throttle valve maximum open position data; and a transport refrigeration system operating mode data.

9. A real-time engine load control method for a transport refrigeration system of a refrigerated transport unit comprising:

a transport refrigeration system controller obtaining real-time engine load information from an engine control unit of an electronically controlled engine;

the transport refrigeration system controller obtaining real-time transport refrigeration system information from the transport refrigeration system; and the transport refrigeration system controller computing a load control parameter for controlling a system load of the transport refrigeration system based on at least one of the real-time transport refrigeration system information and the real-time engine load information.

10. The real-time engine load control method of aspect 9, further comprising the transport refrigeration system controller obtaining real-time engine load information from the engine control unit of the electronically controlled engine via a hardwired control area network communication bus connecting the transport refrigeration system controller to the electronic control unit of the electronically controlled engine.

11. The real-time engine load control method of aspects 9-10, further comprising:

an electronic control unit data processing component of the transport refrigeration system controller processing the real-time engine load information;

a load control component of the transport refrigeration system controller computing the load control parameter for controlling the system load of the transport refrigeration system based on at least one of the real-time transport refrigeration system information and the real-time engine load information;

an electronic throttle valve control component of the transport refrigeration system controller generating a preliminary electronic throttle valve control command for controlling an electronic throttle valve of the transport refrigeration system using the load parameter;

a transport refrigeration system load demand component of the transport refrigeration system controller determining a transport refrigeration system load demand; and a temperature control and transport refrigeration system protection component of the transport refrigeration system controller generating an electronic throttle valve control command based on the preliminary electronic throttle valve control command and the transport refrigeration system load demand.

12. The real-time engine load control method of aspect 11, further comprising the temperature control and transport refrigeration system protection component sending a desired engine operating speed to the electronic control unit.

13. The real-time engine load control method of aspects 11-12, further comprising the temperature control and transport refrigeration system protection component generating the electronic throttle valve control command such that the system load of the transport refrigeration system does not exceed a maximum defined control limit of the electronically controlled engine.

14. The real-time engine load control method of aspects 9-12, wherein the real-time engine load information includes at least one of: an engine percent load at current speed data; an actual engine percent torque data; an engine demand—percent torque data; and an engine fuel rate data.

15. The real-time engine load control method of aspects 9-14, wherein the real-time transport refrigeration system information includes at least one of: a compressor discharge pressure data; a compressor suction pressure data; a solenoid and valve state data; an electronic throttle valve position data; a transport refrigeration system operating mode data; and a transport refrigeration system configuration data.

16. The real-time engine load control method of aspects 9-15, wherein the load control parameter includes at least one of: an electronic throttle valve closing rate data; an electronic throttle valve maximum open position data; and a transport refrigeration system operating mode data.

17. A transport refrigeration system controller of a transport refrigeration system for regulating operating conditions within a refrigerated transport unit of the transport refrigeration system, the transport refrigeration system controller comprising:
a processor including:
an electronic control unit data processing component that is programmed to process real-time engine load information obtained from an electronic control unit of an electronically controlled engine,
a load control component that is programmed to compute a load control parameter for controlling a system load of the transport refrigeration system based on at least one of real-time transport refrigeration system information obtained from the transport refrigeration system and the real-time engine load information,
an electronic throttle valve control component that is programmed to use the load parameter to generate a preliminary electronic throttle valve control command for controlling an electronic throttle valve of the transport refrigeration system,
a transport refrigeration system load demand component that is programmed to determine a transport refrigeration system load demand, and
a temperature control and transport refrigeration system protection component that is programmed to generate an electronic throttle valve control command based on the preliminary electronic throttle valve control command and the transport refrigeration system load demand;
wherein the transport refrigeration system controller is configured to connect to the engine control unit via a hardwired control area network communication bus.

18. The transport refrigeration system controller of aspect 17, wherein the temperature control and transport refrigeration system protection component is programmed to send a desired engine operating speed to the electronic control unit.

19. The transport refrigeration system controller of aspects 17-18, wherein the temperature control and transport refrigeration system protection component is programmed to generate the electronic throttle valve control command such that the system load of the transport refrigeration system does not exceed a maximum defined control limit of the electronically controlled engine.

With regard to the foregoing description, it is to be understood that changes may be made in detail, especially in matters of the construction materials employed and the shape, size and arrangement of the parts without departing from the scope of the present invention. It is intended that the specification and depicted embodiment to be considered exemplary only, with a true scope and spirit of the invention being indicated by the broad meaning of the claims.

What claimed is:

1. A real-time engine load control system for a transport refrigeration system of a refrigerated transport unit comprising:
an engine control unit of an electronically controlled engine configured to provide power to the transport refrigeration system, wherein the engine control unit is programmed to control the electronically controlled engine; and
a transport refrigeration system controller connected to the engine control unit, the transport refrigeration system controller being programmed to obtain real-time transport refrigeration system information and being programmed to regulate operating conditions within the refrigerated transport unit,
wherein the engine control unit is programmed to send real-time engine load information to the transport refrigeration system controller,
the transport refrigeration system controller is programmed to compute a load control parameter for controlling a system load of the transport refrigeration system based on at least one of the real-time transport refrigeration system information and the realtime engine load information,
wherein the transport refrigeration system controller includes:
an electronic control unit data processing component that is programmed to process the real-time engine load information:
a load control component that is programmed to compute the load control parameter for controlling the system load of the transport refrigeration system based on at least one of the real-time transport refrigeration system information and the real-time engine load information:
an electronic throttle valve control component that is programmed to use the load parameter to generate a preliminary electronic throttle valve control command for controlling an electronic throttle valve of the transport refrigeration system;
a transport refrigeration system load demand component that is programmed to determine a transport refrigeration system load demand; and
a temperature control and transport refrigeration system protection component that is programmed to generate an electronic throttle valve control command based on the preliminary electronic throttle valve control command and the transport refrigeration system load demand, and
wherein the temperature control and transport refrigeration system protection component is programmed to adjust a maximum engine control limit of the electronically controlled engine based on at least one of an altitude of the refrigerated transport unit, an ambient temperature surrounding the refrigerated transport unit, a current engine operating speed, a target engine coolant temperature required by the electronically controlled engine, and a target suction pressure required by a compressor of the transport refrigeration system, and
wherein the temperature control and transport refrigeration system protection component is programmed to limit the electronic throttle valve control command such that a load on the electronically controlled engine prevents the electronically controlled engine operating past the adjusted maximum engine control limit when the load on the electronically controlled engine exceeds the adjusted maximum engine control limit.

2. The real-time engine load control system of claim 1, wherein the transport refrigeration system controller is connected to the engine control unit via a hardwired control area network communication bus.

3. The real-time engine load control system of claim 1, wherein the real-time engine load information includes at least one of: an engine percent load at current speed data; an actual engine percent torque data; an engine demand—percent torque data; and an engine fuel rate data.

4. The real-time engine load control system of claim 1, wherein the real-time transport refrigeration system information includes at least one of: a compressor discharge pressure data; a compressor suction pressure data; a solenoid and valve state data; an electronic throttle valve position data; a transport refrigeration system operating mode data; and a transport refrigeration system configuration data.

5. The real-time engine load control system of claim 1, wherein the load control parameter includes at least one of: an electronic throttle valve closing rate data; an electronic throttle valve maximum open position data; and a transport refrigeration system operating mode data.

6. The real-time engine load control system of claim 1, wherein the temperature control and transport refrigeration system protection component is programmed to send a desired engine operating speed to the electronic control unit.

7. The real-time engine load control system of claim 1, wherein the temperature control and transport refrigeration system protection component is programmed to generate the electronic throttle valve control command such that the system load of the transport refrigeration system does not exceed a maximum defined control limit of the electronically controlled engine.

8. A real-time engine load control method for a transport refrigeration system of a refrigerated transport unit comprising:
a transport refrigeration system controller obtaining real-time engine load information from an engine control unit of an electronically controlled engine;
the transport refrigeration system controller obtaining real-time transport refrigeration system information from the transport refrigeration system; and
the transport refrigeration system controller computing a load control parameter for controlling a system load of the transport refrigeration system based on at least one of the real-time transport refrigeration system information and the real-time engine load information;
an electronic control unit data processing component of the transport refrigeration system controller processing the real-time engine load information;
a load control component of the transport refrigeration system controller computing the load control parameter for controlling the system load of the transport refrigeration system based on at least one of the real-time transport refrigeration system information and the real-time engine load information;
an electronic throttle valve control component of the transport refrigeration system controller generating a preliminary electronic throttle valve control command for controlling an electronic throttle valve of the transport refrigeration system using the load parameter;
a transport refrigeration system load demand component of the transport refrigeration system controller determining a transport refrigeration system load demand;
a temperature control and transport refrigeration system protection component of the transport refrigeration system controller generating an electronic throttle valve control command based on the preliminary electronic throttle valve control command and the transport refrigeration system load demand;
the temperature control and transport refrigeration system protection component adjusting a maximum engine control limit of the electronically controlled engine based on at least one of an altitude of the refrigerated transport unit, an ambient temperature surrounding the refrigerated transport unit, a current engine operating speed, a target engine coolant temperature required by the electronically controlled engine, and a target suction pressure required by a compressor of the transport refrigeration system; and
the temperature control and transport refrigeration system protection component limiting the electronic throttle valve control command such that a load on the electronically controlled engine prevents the electronically controlled engine operating past the adjusted maximum engine control limit when the load on the electronically controlled engine exceeds the adjusted maximum engine control limit.

9. The real-time engine load control method of claim 8, further comprising the transport refrigeration system controller obtaining real-time engine load information from the engine control unit of the electronically controlled engine via a hardwired control area network communication bus connecting the transport refrigeration system controller to the electronic control unit of the electronically controlled engine.

10. The real-time engine load control method of claim 8, wherein the real-time engine load information includes at least one of: an engine percent load at current speed data; an actual engine percent torque data; an engine demand—percent torque data; and an engine fuel rate data.

11. The real-time engine load control method of claim 8, wherein the real-time transport refrigeration system information includes at least one of: a compressor discharge pressure data; a compressor suction pressure data; a solenoid and valve state data; an electronic throttle valve position data; a transport refrigeration system operating mode data; and a transport refrigeration system configuration data.

12. The real-time engine load control method of claim 8, wherein the load control parameter includes at least one of: an electronic throttle valve closing rate data; an electronic throttle valve maximum open position data; and a transport refrigeration system operating mode data.

13. The real-time engine load control method of claim 8, further comprising the temperature control and transport refrigeration system protection component sending a desired engine operating speed to the electronic control unit.

14. The real-time engine load control method of claim 8, further comprising the temperature control and transport refrigeration system protection component generating the electronic throttle valve control command such that the system load of the transport refrigeration system does not exceed a maximum defined control limit of the electronically controlled engine.

15. A transport refrigeration system controller of a transport refrigeration system for regulating operating conditions within a refrigerated transport unit of the transport refrigeration system, the transport refrigeration system controller comprising:
a processor including:
an electronic control unit data processing component that is programmed to process real-time engine load information obtained from an electronic control unit of an electronically controlled engine, a load control component that is programmed to compute a load control parameter for controlling a system load of the transport refrigeration system based on at least one of real-time transport refrigeration system information obtained from the transport refrigeration system and the real-time engine load information, an electronic throttle valve control component that is programmed to use the load parameter to generate a preliminary electronic throttle valve control command for controlling an electronic throttle valve of the transport refrigeration system, a transport refrigeration system load demand component that is programmed to determine a transport refrigeration system load demand, and a temperature control and transport refrigeration system protection component that is programmed to generate an electronic throttle valve control command based on the preliminary electronic throttle valve control command and the transport refrigeration system load demand;

wherein the transport refrigeration system controller is configured to connect to the electronic control unit via a hardwired control area network communication bus, wherein the temperature control and transport refrigeration system protection component is programmed to adjust a maximum engine control limit of the electronically controlled engine based on at least one of an altitude of the refrigerated transport unit, an ambient temperature surrounding the refrigerated transport unit, a current engine operating speed, a target engine coolant temperature required by the electronically controlled engine, and a target suction pressure required by a compressor of the transport refrigeration system, and wherein the temperature control and transport refrigeration system protection component is programmed to limit the electronic throttle valve control command such that a load on the electronically controlled engine prevents the electronically controlled engine operating past the adjusted maximum engine control limit when the load on the electronically controlled engine exceeds the adjusted maximum engine control limit.

16. The transport refrigeration system controller of claim 15, wherein the temperature control and transport refrigeration system protection component is programmed to send a desired engine operating speed to the electronic control unit.

17. The transport refrigeration system controller of claim 15, wherein the temperature control and transport refrigeration system protection component is programmed to generate the electronic throttle valve control command such that the system load of the transport refrigeration system does not exceed a maximum defined control limit of the electronically controlled engine.

18. The real-time engine load control system of claim 1, wherein the maximum engine control limit is a maximum engine torque value.

19. The real-time engine load control method of claim 8, wherein the maximum engine control limit is a maximum engine torque value.

20. The transport refrigeration system controller of claim 15, wherein the maximum engine control limit is a maximum engine torque value.

* * * * *